United States Patent [19]

Gormish et al.

[11] 4,047,338

[45] Sept. 13, 1977

[54] METHOD AND APPARATUS FOR REDUCING LATERAL FORCE VARIATIONS AND OVERTURNING MOMENT VARIATIONS IN PNEUMATIC TIRES

[75] Inventors: Kenneth J. Gormish, Tallmadge; Clarence Hofelt, Jr., Hudson; Silvano Anthony Lavecchia, Uniontown; Clarence Arthur Ripley, Jr., Tallmadge, all of Ohio

[73] Assignee: The General Tire & Rubber Company, Akron, Ohio

[21] Appl. No.: 641,861

[22] Filed: Dec. 17, 1975

[51] Int. Cl.$^2$ ............................................. B24B 49/00
[52] U.S. Cl. ............................. 51/106 R; 51/165 R; 51/281 R; 51/DIG. 33
[58] Field of Search ......... 51/DIG. 33, 106 R, 165 R, 51/281 R

[56] References Cited

U.S. PATENT DOCUMENTS

| | | | |
|---|---|---|---|
| 3,500,681 | 3/1970 | Shively | 51/DIG. 33 |
| 3,574,973 | 4/1971 | Rader | 51/165 R |
| 3,724,137 | 4/1973 | Hofelt | 51/106 R |
| 3,725,163 | 4/1973 | Hofelt | 51/106 R |
| 3,739,533 | 6/1973 | Iida | 51/281 R |
| 3,848,368 | 11/1974 | Toshioka | 51/106 R |
| 3,946,527 | 3/1976 | Beer | 51/281 R |

Primary Examiner—Harold D. Whitehead

[57] ABSTRACT

A method and apparatus for reducing lateral force variations and overturning moment variations in pneumatic tires by detecting the magnitude, direction and location of such variations and alternatingly grinding off opposite portions of the two shoulders of the tire tread. A tire is mounted on a test rim, inflated to operating pressure, and rotated under a normal service load against a loading drum. Force variations in the lateral and radial directions are detected and measured by load cells operatively associated with the drum axle and located at opposite ends of the axle. The sum of the lateral force variation forces or the difference of the radial force variation forces measured by the load cells provides a voltage level signal representative of the direction, magnitude and location of the lateral force variation and the overturning moment variation. The phase angle of this signal is ascertained to determine the location on the tire of these variations. Where these variations exceed a preset level, they are reduced by alternatingly grinding a zone of one shoulder of the tire tread and the opposite zone of the other shoulder of the tire tread in response to the phase angle of the variation signals. Reduction of lateral force variations by this method also reduces radial force variation.

4 Claims, 6 Drawing Figures

METHOD AND APPARATUS FOR REDUCING LATERAL FORCE VARIATIONS AND OVERTURNING MOMENT VARIATIONS IN PNEUMATIC TIRES

BACKGROUND OF THE INVENTION

This invention relates to the manufacture of pneumatic tires for automotive vehicles especially to the post-cure processing of such tires to assure dynamic uniformity. More particularly, the invention relates to a method and apparatus for reducing variations in lateral force and overturning moment and to the combination of that function with the function of reducing radial force variations, both in a single convenient post-cure operation using equipment easily adapted from tire uniformity correction machines such as that shown in U.S. Pat. No. 3,724,137.

Existing tire uniformity machines for correcting radial force variations in pneumatic tires generally comprise split rim sections on which a tire is mounted and then inflated to specified pressure. The inflated tire is rotated at a specified operating speed while deflected by a loading drum adapted to apply a predetermined radial load against the tire. The loading drum is mounted for free rotation about its axle and variations in radial force experienced during rotation of the tire are sensed and measured by load transducers as disclosed in the U.S. Pat. No. 3,724,137.

Rotary grinders, positioned adjacent to the shoulders of the tire tread, are moved together into grinding engagement with those portions of the tread where excessive positive force variations have been detected. The rotary grinders consequently remove sufficient material from the tread shoulders to reduce the magnitude of the force variations to an acceptable level.

Certain customers specify lateral force variation values as well as radial force variation values. Tire uniformity correction machines adapted to reduce only radial force variations to an acceptable level do not change lateral force variation values. In some instances, lateral force variations can exceed customer specification limits and in these cases the tires may not be supplied to this customer.

The method and apparatus of the present invention, however, provide for more effective tire uniformity by reducing variations in lateral force and overturning moment as well as variations in radial force and also afford other features and advantages heretofore not obtainable.

SUMMARY OF THE INVENTION

It is among the objects of the prevent invention to improve the uniformity of the pneumatic tires by post-cure processing. Another object of the invention is to improve the tire uniformity correction process of conventional tire uniformity correction machines by accomplishing the additional function of reducing self-excited lateral force and overturning moment variations in the tire.

Still another object of the invention is to sense and measure tire non-uniformities of lateral force variations and reduce those variations that exceed predetermined limits.

These and other objects and advantages are achieved by the unique method and apparatus of the invention and wherein a pneumatic tire is mounted on a rim, inflated and placed in equipment adapted to rotate the tire against a loading drum under a predetermined load. As the tire is rotated, load cells operatively associated with the drum, such as force transducers, located at opposite ends of the drum axle, measure individually radial and lateral force variation components. If the radial force variations from the individual cell readings from each end of the axle are summed, the radial force variations generated are obtained. If the lateral force variations from the individual cell readings from each end of the axle are summed, a measure of the lateral force variations and overturning moment is obtained. The difference of the radial force variations on the axle ends is a measure of the lateral force variations and overturning moment variations.

A voltage level signal is obtained representative of the magnitude and direction of the variation in lateral force variation. This signal is passed through a phase shift detector to determine the lateral force variation phase angle, and through a comparator to compare the force variation signal with preset limits as an equivalent alternative the lateral force variation signal obtained from the sum of the lateral force cells at each end of the axle may be passed through a phase shift detector and comparator.

Where the lateral force variation exceeds the preset acceptable level, rotary grinders positioned adjacent to the shoulders of the tire tread are moved into grinding engagement with the shoulders of the tread alternatingly in response to the lateral force variation phase angle in such a way that one grinder grinds a zone of one shoulder after which the other rotary grinder grinds the opposite zone of the other shoulder. The grinding is accomplished in such an order and sequence to reduce the variations in lateral force and overturning moment to an acceptable level. As used herein, the reduction of lateral force variation inherently includes the corresponding reduction of the overturning moment variations caused by lateral force varation reduction.

DESCRIPTION OF THE PREFERRED EMBODIMENTS

Figure 1:
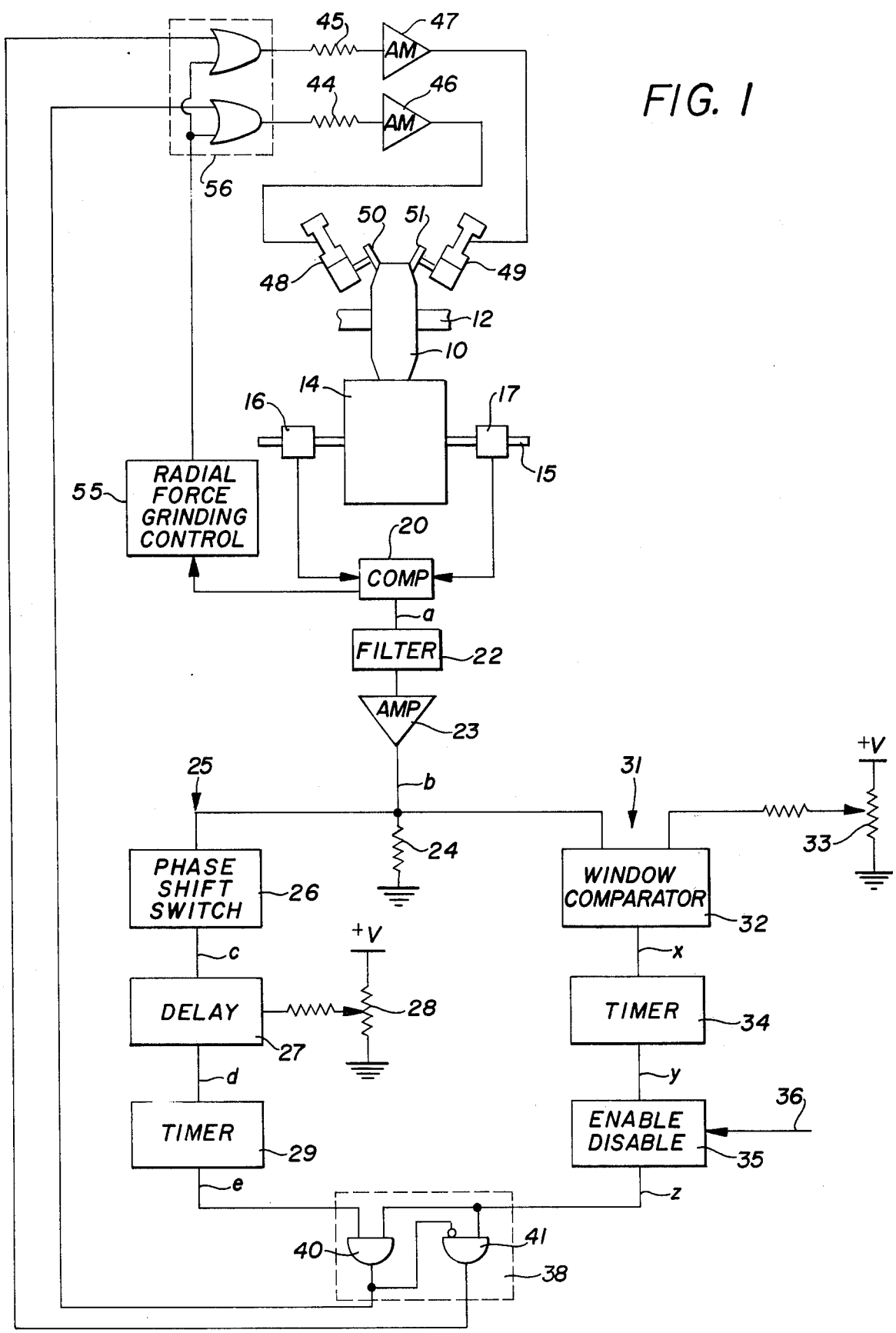
FIG. 1 is a schematic diagram partly in block form illustrating the control system of the invention for sensing, measuring and reducing variations in lateral force in a pneumatic tire.

Referring more particularly to the drawings and initially to FIG. 1, there is shown by schematic representation, a typical tire uniformity machine modified to practice the method of the present invention. A tire 10 is mounted on a rim, such as a solid or split rim 11, or an ordinary car wheel, carried on an axle 12 turned by a rotary drive. A loading drum 14 having a circumferential surface is moved into contact with the tire 10 and applies a predetermined deflecting load. The loading drum 14 is mounted for free rotation on a non-rotating axle 15. Along the axle 15 at equal distances from the midpoint of the drum 14 are two load cells 16 and 17. The load cells 16 and 17 contain sensors such as strain gauges which measure the force on the drum in the vertical and horizontal directions and convert the measurements to voltage level signals. In a conventional tire uniformity correction machine, such as the machine of U.S. Pat. No. 3,724,137, which is incorporated by reference herein, the outputs of the load cells 16 and 17 are summed to obtain the radial force variations experienced during rotation of the tire 10.

In accordance with the present invention, the outputs of the load cells 16 and 17 are fed into a computer 20. The computer 20 may be a simple analog addition/substraction device, or a digital computer of the mini-computer or micro-computer class. Such devices are readily available on the commerical market at a minimum cost and can be easily programmed to manipulate the signals inputted to provide the desired output.

In the past, the outputs from the left and right load cells 16 and 17 have been summed to yield radial force and radial force and lateral force variations. However, the difference of these readings and the excess of one cell output with respect to the other provides the moment and moment direction which is present only if lateral force or lateral force variations are present. This difference is also proportional to the overturning moment variation which is proportional to the lateral force variation. Thus, the computer 20 can provide a signal proportional to the lateral force variations by subtracting the difference between the radial force outputs of the two load cells 16 and 17. Through this method, the lateral force variation can be obtained from the computer output using the same load cells used to measure radial force variations. Alternately and preferably the lateral force variations obtained from the sum of the lateral force cells may be used.

Figure 2A:
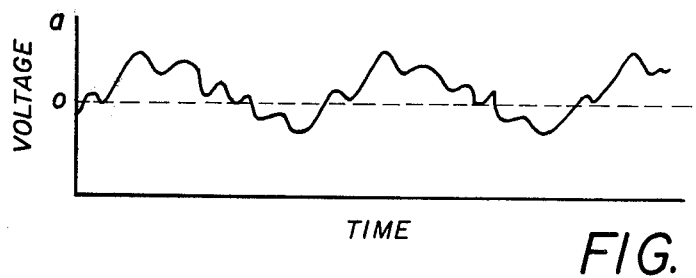
FIGS. 2a through 2e are graphs illustrating various voltage level signals occuring at various stages in the control system of the invention.

The computer 20 also calculates the mean value for the lateral force variation. The lateral force variation is related to this means value so that a variation in one direction is positive and a variation in the opposite direction is negative. Determination of this mean and the centering of the signal on the mean eliminates the effects of the invariant lateral force offset from zero. As shown in FIG. 2a, the lateral force variation signal $a$ is a composite wave form comprising a first harmonic signal and several higher harmonics.

Figure 2B:
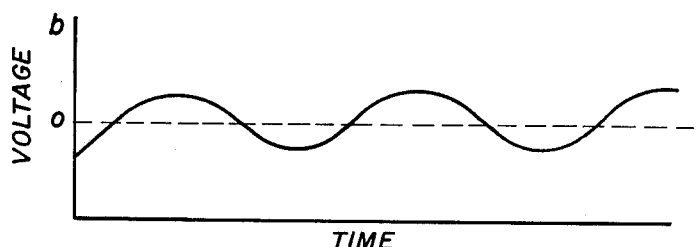

The output signal $a$ from the computer 20 is fed into a first harmonic filter 22 and then into an amplifier 23. The filtered first harmonic signal $b$ is shown in FIG. 2b. This signal is then grounded through a suitable impedance 24.

As shown in FIG. 1, the first harmonic signal $b$ is sent through two parallel paths 25 and 31. Path 25 comprises means for producing a delayed phase shift signal from the first harmonic signal. This signal is used to ascertain the phase angle of the first harmonic of lateral force variation of the tire. As used herein, the "phase angle" of the first harmonic is defined as the angular distance from an arbitrary location on the tire to the point of maximum positive magnitude of the first harmonic of lateral force variation. Determination of the phase angle is necessary to determine the location on the tire where the corrective grinding is to be done.

Figure 2C:
Figure 2D:
Figure 2E:

Along path 25 the first harmonic signal $b$ is first fed into a 180° phase shift switch 26. When the first harmonic of the lateral force variation passes through the zero line and becomes positive, the phase shift switch 26 produces a high level output signal. When the first harmonic signal next passes through the zero line and becomes negative, the output from phase shift switch 26 steps down to a low level. The output signal $c$ from the phase shift switch 26 is represented in FIG. 2c. FIGS. 2b and 2c are shown with a common time line so that it can be seen that the signal $c$ steps up and down in relation to the phase angle of the first harmonic signal $b$. The signal $c$ is then fed into an adjustable delay 27. The time of the delay 27 can be adjusted through the adjustment of a set point 28. The output signal $d$ of the delay 27 steps up to produce a high level output when the signal $c$ from the phase shift switch 26 steps up. The signal $d$ then steps down to a low level after the preset interval. The output signal $d$ from the delay 27 is shown in FIG. 2d. The effect of the delay 27 on the output signal $c$ from the phase shift switch 26 can be seen by comparing FIGS. 2c and 2d. The interval during which the signal $d$ remains at the high level is determined by the setting of the set point 28. The signal $d$ from the delay 27 is then fed into a timer 29. The output signal $e$ from the timer 29 steps up when the signal $d$ from the delay 27 steps down. The signal $e$ remains at the high level for an interval corresponding to one-half rotation of tire. The function of the timer 29 is shown by comparison of FIGS. 2d with 2e, as can be seen by comparing FIGS. 2c with 2e, the delay 27 and the timer 29 combine to comprise a phase delay device which delays the signal $c$ from the phase shift switch 26. This delay is equal to the preset interval inputted into delay 27. The delay is necessary to compensate for the angular distance around the tire between the measurement point at the test drum 14 and the correction point at the rotary grinders and to compensate for lags in the electronics of the system.

The signal $b$ is also fed along path 31 which comprises means for producing a signal with controls whether grinding will take place. This first harmonic signal $b$ is first fed into a window comparator 32. A preset level from set point 33 is also fed into the comparator 32. The comparator 32 compares the level of the first harmonic signal $b$ with the preset level. If the amplitudes of the first harmonic signal, i.e., the positive or negative maximums of the signal, are greater than the preset level, the comparator 32 outputs a high level signal $x$. This high level signal or "grind" signal represents that the tire 10 mounted on axis 12 has lateral force variations beyond the acceptable preset limits and that corrective grinding should be undertaken. If the amplitude of the first harmonic signal $b$ is within the preset limits, that is, the positive and negative variations of the first harmonic are within the "window," then a low level signal $x$ is outputted by the comparator 32. This low level signal represents a "no grind" signal. The output signal $x$ from the comparator 32 is then fed into a timer 34. The timer 34 allows the "grind" signal from the comparator 32 to be continued after the lateral force variation has been corrected to be within the window in order to compensate for the delays in the system. The output signal $y$ from the timer 34 is fed into the an enable/disable device 35. The enable/disable device 35 responds to an input signal 36. The device 35 allows the entire lateral force correction control mechanism to be disabled upon direction from an input signal 36 if lateral force variation corrections are not desired for the particular tire in the correction machine. If device 35 receives a disable signal 36, it outputs as signal $z$ only a low level "no grind" signal. Otherwise, device 35 allows the signal $y$ to be passed through to signal $z$ unchanged.

The alternating phase shift signal $e$ from path 25 and the "grind"/"no grind" signal $z$ from path 31 are fed into a logical alternator 38. The alternator 38 comprises two AND gates 40 and 41 which supply the "grind" signal to each grinder alternatingly in response to the lateral force variation phase angle. The two signals are first fed into gate 40. If a high level signal is obtained from signal e representing a positive lateral force variation signal and if a high level "grind" signal is supplied from signal z, gate 40 issues a high level "grind" signal. If, however, either input signal c or z is low level, gate 40 issues a low level signal. Gate 41 monitors the output signal from gate 40 and the "grind"/"no grind" signal z. Gate 41 issues a high level "grind" signal only if the output signal from gate 40 is low and a high level "grind" signal is supplied by signal z. Otherwise, gate 41 produces a low level output signal. Thus, as long as a "grind" signal is supplied by signal z one of the gates 40 or 41 will produce a high level "grinding" signal. Which of the gates 40 or 41 produces the "grinding" signal depends upon the phase shift signal e.

The output signals from gates 40 and 41 are fed through suitable impedances 44 and 45 to servo-amplifiers 46 and 47. The outputs from the servo-amplifiers 46 and 47 actuate servovalves 48 and 49 which move the rotary grinders 50 and 51 into place to correctively grind the tire tread shoulder and which move the grinder away from the tire when the grinding is finished.

As a result of the lateral force variation correction system just described, when the first harmonic of the lateral force variation passes through the zero line, a "grind" signal is supplied to either the left grinder 50 or the right grinder 51. This grinding continues until the first harmonic of the lateral force variation next passes through the zero line. At this time the "grind" signal is supplied to the other grinder and the first grinder is retracted. This result in the tire alternatingly being ground on the top and the bottom of the tread shoulders in 180° lengths around the tire. This alternating grinding continues until the lateral force variation comes within the preset limits at which time all grinding ceases.

All tires for which lateral force correction is undertaken will be ground over 180° lengths on opposite tread shoulders. The only variables which change from tire to tire are the phase angle and the corresponding point at which the grinding is to begin on one shoulder and end on the other, and the length of time that the alternating grind is to continue. These variables are input by the phase shift signal e and the "grind"/"no-grind" signal z.

Radial force correction may also be incorporated into this system so that radial and lateral force corrections can occur simultaneously. The computer 20 can be programmed to output a radial force variation signal in addition to the lateral force variation. This radial force variation signal can be inputted into a radial force grinding control system 55 such as that disclosed in U.S. Pat. No. 3,724,137. Control system 55 outputs a command to the grinders to grind both sides of the tire simultaneously if the radial force variation is beyond specified limits. This output is properly delayed to compensate for the angular distance around the tire between the measurement at drum 14 and the correction at the grinders and for electronic lags. The output from the control system 55 is then logically ORed with the lateral force correction signal by means of a logical OR gate 56. The OR gate 56 supplies a "grind" signal to each servo-amplifier 46 or 47 if the radial force grinding control system 55 supplies a "grind" signal or if the lateral force control system supplies a "grind" signal to the corresponding servo-valve.

Although the method disclosed herein uses the first harmonic or the lateral force variation, the composite variation, any higher harmonic, or the inverse function of several harmonics may be used as the basis for lateral force correction.

Other modifications may be added to the system which are known to those who practice correction of the tire non-uniformities. For example, eccentricity or free radial run-out detector transducers such as those disclosed in U.S. Pat. No. 3,724,137 may be added to the system. Such transducers sense the free run-out and height of the tire shoulders. This information is fed into amplifiers 46 and 47 to correct the position of the grinders 50 and 51 based upon the eccentricity or run-out of the tire shoulder. Also, an additional comparator and preset level may be added to the system so that no lateral force variation corrections are done on tires for which the lateral force variations would be so great that correction should not be attempted.

Other modifications and variations in the specific method and machine herein shown and described will be apparent to those skilled in the art within the intended scope and spirit of the invention. While the invention has been shown and described with the respect to a specific embodiment thereof, this is intended for the purpose of illustration rather than limitation. Accordingly, the patent is not to be limited to the specific embodiments herein shown and described nor in any other way that is inconsistent with the extent to which the progress in the art has been advanced by the invention.

We claim:

1. A method for reducing variations in lateral force wherein the sensing and measuring step comprises:
   a. measuring load forces in the radial direction at two locations equally spaced from and on opposite sides of the mid-plane of the tire;
   b. converting said force measurements to voltage level signals; and
   c. subtracting one of said signals from the other to obtain a resulting signal representative of the magnitude and direction of the lateral force variation and overturning moment variation;
   d. comparing the lateral force variation with a preset level to determine if said variation is unacceptable;
   e. determining the point on the tire at which the lateral force variation is at its maximum; and
   f. grinding alternatingly the tread shoulders of the tire if the lateral force variation exceeds said preset level, a zone of one shoulder being ground and the opposite zone of the other shoulder being ground, said zones being chosen in response to the point of maximum lateral force variation determined in step (e).

2. A method for reducing variations in lateral force generated by a pneumatic tire while inflated and rotated under load, comprising the steps of:
   a. sensing and measuring forces in the radial direction generated by said tire, at two locations equally spaced from and on opposite sides of the mid-plane of said tire;
   b. converting said force measurements to voltage level signals;
   c. subtracting one of said signals from the other to obtain a resulting voltage level signal representative of the magnitude and direction of lateral force variations generated by said tire; and
   d. grinding a shoulder of said tire in response to said resulting voltage level signal to reduce said variations.

3. Apparatus for reducing variations in lateral force wherein said sensing and measuring means comprises:
   a. two load cells equally spaced from and on opposite sides of the mid-plane of the tire for measuring load forces in the radial direction;
   b. converting said force measurements to voltage level signals; and
   c. means for subtracting one of said signals from the other to obtain a resulting signal representative of the magnitude and direction of the lateral force variation;
   d. means for comparing the lateral force variation with a preset level to determine if said variation is unacceptable;
   e. means for determining the point on the tire at which the lateral force variation is at its maximum; and
   f. means for grinding alternatingly the tread shoulders of the tire if the lateral force variation exceeds said preset level, a zone of one shoulder being ground and the opposite zone of the other shoulder being ground, said zones being chosen in response to said determining means.

4. Apparatus for reducing variations in lateral force generated by a pneumatic tire while inflated and rotated under load, which comprises:
   a. means for sensing and measuring forces in the radial direction generated by said tire, at two locations equally spaced from and on opposite sides of the mid-plane of said tire;
   b. means for converting said force measurements to voltage level signals;
   c. means for subtracting one of said signals from the other to obtain a resulting voltage level signal representative of the magnitude and direction of lateral force variations generated by said tire; and
   d. a grinder for grinding a shoulder of said tire in response to said resulting voltage level signal to reduce said variations.

* * * * *